United States Patent
Boese et al.

(10) Patent No.: US 7,037,431 B2
(45) Date of Patent: May 2, 2006

(54) METHOD FOR REMOVING ACID FROM AN APROTIC LIQUID

(75) Inventors: Olaf Boese, Hannover (DE); Katja Peterkord, Hannover (DE)

(73) Assignee: Solvay Fluor und Derivate GmbH, Hannover (DE)

(*) Notice: Subject to any disclaimer, the term of this patent is extended or adjusted under 35 U.S.C. 154(b) by 112 days.

(21) Appl. No.: 10/791,272

(22) Filed: Mar. 3, 2004

(65) Prior Publication Data

US 2004/0232081 A1    Nov. 25, 2004

Related U.S. Application Data

(63) Continuation of application No. PCT/EP02/09545, filed on Aug. 27, 2002.

(30) Foreign Application Priority Data

Sep. 4, 2001   (DE) ................ 101 43 171

(51) Int. Cl.
*C02F 1/42* (2006.01)
*B01D 15/00* (2006.01)

(52) U.S. Cl. ...................... 210/679; 558/146

(58) Field of Classification Search ............... 210/660, 210/663, 668, 679, 683, 689; 558/146
See application file for complete search history.

(56) References Cited

U.S. PATENT DOCUMENTS

| | | | | |
|---|---|---|---|---|
| 4,104,160 A | * | 8/1978 | Wegmuller et al. | 210/679 |
| 4,238,328 A | * | 12/1980 | Bowes et al. | 210/688 |
| 6,780,327 B1 | * | 8/2004 | Wu et al. | 210/660 |

FOREIGN PATENT DOCUMENTS

| | | |
|---|---|---|
| DE | 19827631 | 12/1999 |
| EP | 593771 | 4/1994 |
| JP | 62216641 | 9/1987 |
| JP | 62225244 | 10/1987 |
| WO | 9967843 | 12/1999 |
| WO | 0228500 | 4/2002 |

* cited by examiner

*Primary Examiner*—Chester T. Barry
(74) *Attorney, Agent, or Firm*—Crowell & Moring LLP

(57) ABSTRACT

Acids can be removed from aprotic organic liquids by bringing the liquids into contact with polyalkyleneimines that have been applied to a support. Polyethyleneimine that has been applied to amorphous silicon dioxide is particularly suitable for this method. The method can be used, for example, to eliminate acidic components from fluorinated esters.

10 Claims, No Drawings

METHOD FOR REMOVING ACID FROM AN APROTIC LIQUID

CROSS REFERENCE TO RELATED APPLICATIONS

This application is a continuation of international patent application no. PCT/EP02/09545, filed Aug. 27, 2002 designating the United States of America and published in German as WO 03/020392, the entire disclosure of which is incorporated herein by reference. Priority is claimed based on Federal Republic of Germany patent application no. DE 101 43 171.6, filed Sep. 4, 2001.

BACKGROUND OF THE INVENTION

The present invention relates to a new method which is suitable for removing acids from aprotic organic liquids.

Organic liquids, such as solvents, may contain acid for reasons associated with their manufacture or also for other reasons. Esters of carbonic and carboxylic acids, phosphoric acid, phosphonic acid or phosphinic acid may be contaminated, for example, with the corresponding free acid, HF or HCl. Frequently, however, substantial absence of acids is desirable. This is the case, for example, with solvents, which are to be used in the electrolytes of batteries or capacitors.

SUMMARY OF THE INVENTION

It is an object of the present invention to provide an improved method for removing acidic components from aprotic organic liquids.

Another object of the invention is to provide a method for the removal of acids contained in aprotic organic solvents, which avoids contamination of the solvent.

A further object of the invention is to provide a method for removing acids from aprotic organic substances which can be used with substances sensitive to alkaline hydrolysis.

These and other objects are achieved in accordance with the present invention by providing a method for removing acid from an aprotic, organic liquid, said method comprising contacting said liquid with an acid collector, wherein the acid collector comprises a polyalklyeneimine applied on a support.

The method according to the invention for removing acids from aprotic, organic liquids, which are contaminated with acid, is based on the use of a polyalkylene imine, applied on a support, as an acid collector.

Polypropylene imines, for example, can be used. Preferably, polyethylene imines are used. For simplicity of description, the invention will be described in further detail hereinafter with reference to this preferred embodiment, but it should be understood that the invention is not limited to the use of polyethylene imines.

Preferably, the polyethylene imines are applied on an inorganic oxide support, especially on silicon dioxide. Amorphous silicon dioxide, such as silica gel, is a particularly preferred support.

The composition of polyethylene imine, absorbed on the support used, can be used for the purpose of removing acid from aprotic, organic liquids. The acid may be organic or inorganic and result from manufacturing conditions or from other sources.

With the inventive method, liquids can be obtained having an acid content which is very low, for example, less than 50 ppm. The inventive method is highly suitable for producing essentially acid-free aprotic, organic liquids, which are to be used in electrotechnology, for example, as electrolyte solvents. Preferably, they are esters of carbonic acid, acetic acid, propionic acid, halogen-containing C1–C4 carboxylic acids, or esters of phosphoric acid, phosphonic acid or phosphinic acid, substituted or not substituted by halogens. The method of the invention is particularly suitable for removing acid from esters of carbonic acid, acetic acid, propionic acid, phosphoric acid or phosphinic acid, substituted by at least one fluorine atom. Moreover, these esters may be substituted additionally by other substituents, such as alkoxy or fluoroalkoxy groups. Purification with dialkyl carbonates, alkylene carbonates, acetate esters, propionic esters and alkyl 2-methoxytetrafluoropropionates, substituted by at least 1 fluorine atom, is particularly preferred. Preferably, "alk" is C1–C4. This is also the case for the alkyl group of phosphinic acid, which may also be substituted by at least 1 fluorine atom, as well as for corresponding esters of phosphinic acid.

The method of the invention may, however, also be employed for other classes of substances, such as ethers, malonate esters and generally alkylene-bridged diesters, especially if they are compounds substituted by at least 1 fluorine atom.

Compounds, which can be purified well in accordance with the present invention include, for example, the fluorine-containing ethers described in EP 807,986, the partially fluorinated carbonates of EP 806,804 and EP 887,874; the dioxolones of WO 01/38319, the fluorinated alkyl carbonates of German application no. DE 101 13 902, the difluoromalonate esters of German patent application no. DE 100 37 67, and the alkylene-bridged diesters, phosphate esters and phosphonate esters disclosed in WO 00/38264, especially esters derived from trifluoroethanol, such as the tris (trifluoroethyl) phosphates described in EP 696,077 or EP 806,804 and the phosphonate or phosphinate esters described in U.S. Pat. No. 6,210,840.

In the following, a simple method is given for the preparation of the supports, on which the polyalkylene imine is absorbed, using polyethylene imine as example. The support (advisably a porous material, preferably an inorganic oxide material, especially silicon dioxide) is contacted with an aqueous solution of the polyethylene imine. If this type of preparation is selected, only those polyethylene imines, the polymerization of which was terminated before the threshold of water insolubility was exceeded, are used. Appropriate polyethylene imines are commercially available, for example, under the trademark Polymin™. The support, which then contains absorbed polyethylene imine, is dried and then is ready for use. Finished compositions, which contain the polyethylene imine on a silica support, are commercially available from Aldrich Chemical.

The method of the invention enables the anhydrous removal of acids contained in aprotic, organic liquids. The acid-removal agent can be separated simply by decanting or filtering. It can be used over a wide range of concentrations of the acid impurity. The organic liquid, which represents, for example, a solvent, is not contaminated by organic compounds. It can also be used for substances, which are sensitive to alkaline hydrolysis, and is suitable particularly for use in the area of electrolyte solvents of high purity for batteries, especially lithium ion batteries and capacitors. The purified electrolyte solvent can be treated with conducting salts, such as lithium or tetraalkylammonium salts of anions, such as hexafluorophosphate, tetrafluoroborate or trifluoromethanesulfonate and the electrolyte can be prepared. If desired, the electrolyte of conducting salt and electrolyte solvent can also be produced first and then treated pursuant to the invention for the purpose of removing acids. Organic acids, HF and HCl can be removed in this way.

EXAMPLES

The following examples are intended to illustrate and explain the invention in further detail without limiting its scope.

Example 1

Purification of Methyl 2-Methoxytetrafluoropropionate

Methyl 2-methoxytetrafluoropropionate (10 grams; 190 g/mole, 0.053 moles) containing 40 ppm of free acid, was contacted for 20 minutes with 1 gram of polyethylene imine absorbed on silica gel (Aldrich). Subsequently, the content of free acid was 16 ppm.

Example 2

Purification of Trifluoroethylmethyl Carbonate

Trifluoroethylmethyl carbonate (10 grams; 158 g/mole; 0.063 moles) containing 48 ppm of free acid, was contacted for 20 minutes with 1 gram of polyethylene imine absorbed on silica gel. Subsequently, the content of free acid was 26 ppm.

Example 3

Purification of Trifluoroethyl Acetate

Trifluoroethyl acetate (10 grams; 142 g/mole; 0.070 moles) containing 0.244% (GC, area percent) of free acid, was contacted for 20 minutes with 1 gram of polyethylene imine absorbed on silica gel. Subsequently, the free acid content of the trifluoroethyl acetate was 0.038% (GC; area percent).

The solvents described in Examples 1 to 3 could be used without further purification as electrolyte solvents for lithium or tetraalkylammonium salts for lithium ion batteries and double-layer capacitors.

The foregoing description and examples have been set forth merely to illustrate the invention and are not intended to be limiting. Since modifications of the described embodiments incorporating the spirit and substance of the invention may occur to persons skilled in the art, the invention should be construed broadly to include all variations within the scope of the appended claims and equivalents thereof.

What is claimed is:

1. A method for removing acid from an aprotic, organic liquid, said method comprising contacting said liquid with an acid collector, wherein the acid collector comprises a polyalklyeneimine applied on a support.

2. A method according to claim 1, wherein the acid collector comprises polyethyleneimine.

3. A method according to claim 1, wherein said support comprises an inorganic oxide.

4. A method according to claim 3, wherein said support comprises silicon dioxide.

5. A method according to claim 4, wherein said support is amorphous silicon dioxide.

6. A method according to claim 1, wherein said liquid is an aprotic, fluorinated organic liquid.

7. A method according to claim 6, wherein said aprotic fluorinated organic liquid comprises an ester substituted by at least one fluorine atom.

8. A method according to claim 7, wherein the fluorinated ester is selected from the group consisting of fluorinated carboxylate esters, acetate esters, propionate esters, phosphate esters, phosphonate esters and phosphinate esters.

9. A method according to 1, said aprotic organic liquid is an electrolyte solvents.

10. A method according to claim 9, wherein said aprotic organic liquid is an electrolyte which contains conducting salt and electrolyte solvents.

* * * * *